FIG. I

William A. Schulze
Herbert W. Fuhrmann,
INVENTORS.

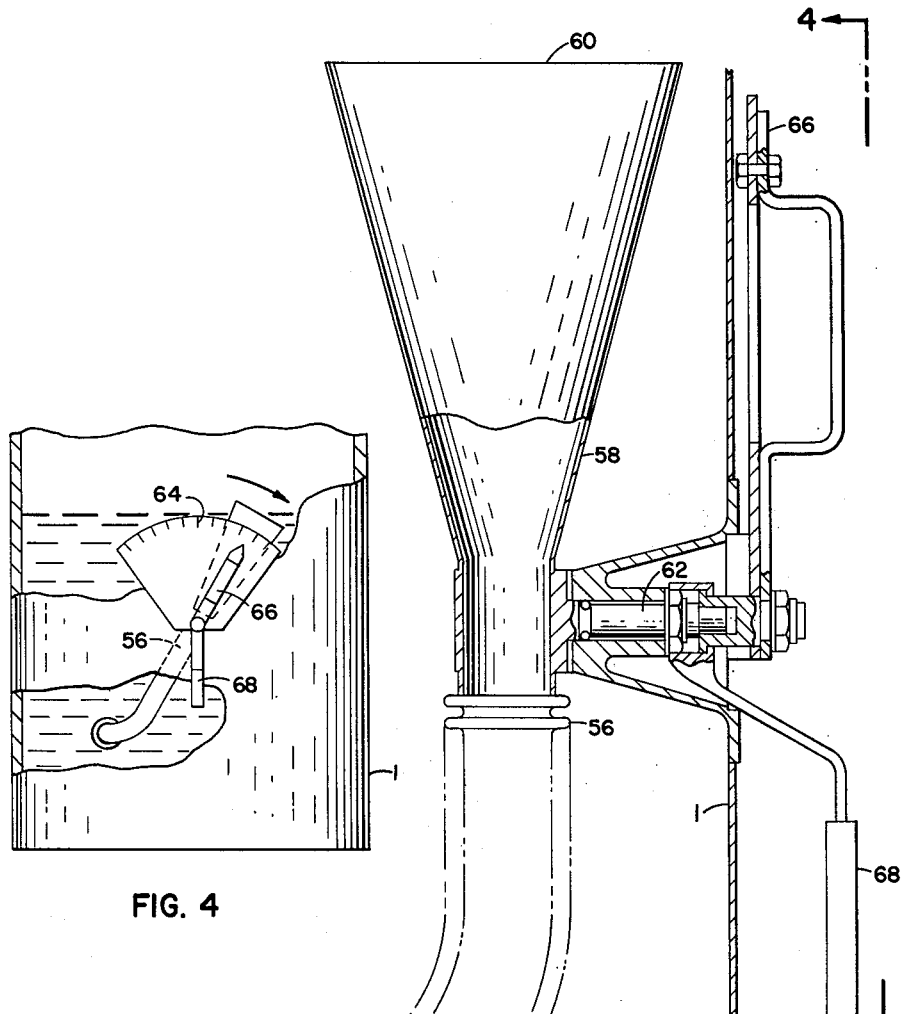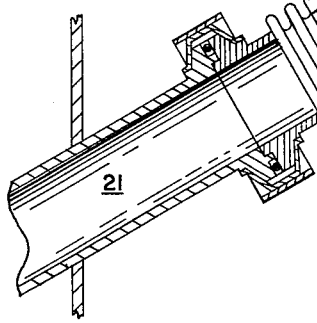
FIG. 4
FIG. 3
William A. Schulze
Herbert W. Fuhrmann,
INVENTORS.

United States Patent Office 3,164,992
Patented Jan. 12, 1965

3,164,992
LIQUID LEVEL INDICATING AND VARYING DEVICE
William A. Schulze and Herbert W. Fuhrmann, Huntsville, Ala., assignors to the United States of America as represented by the Secretary of the Army
Filed Jan. 8, 1962, Ser. No. 165,047
8 Claims. (Cl. 73—298)
(Granted under Title 35, U.S. Code (1952), sec. 266)

The invention described herein may be manufactured and used by or for the Government for governmental purposes without the payment of any royalty thereon.

This invention relates to a liquid level indicating and varying device. Such a device enables the liquid level, in a container, to be determined instantly and varied until the desired amount is present in the container. In the use of missiles, utilizing liquid propellants, there is a need for a device that will accurately indicate and vary the amount of fuel contained in the missile's propellant tank.

Accordingly, an object of this invention is to provide a device that will enable the required amount of liquid propellant to be maintained in a missile until it is launched.

Another object of this invention is to provide a device that will enable the propellant level to be changed to a predetermined amount when temperature variances create a change in the amount of propellant contained in the missile's tank.

A further object of this invention is to provide a device that will eliminate the need for using extremely accurate scales and flowmeters, at missile launching sites, when supplying the propellant to the missile.

The foregoing and other objects of this invention will become more fully apparent from the following detailed description of the invention and from the accompanying drawings, in which:

FIGURE 3 is a sectional view, partly broken away, showing another embodiment of the invention.

FIGURE 4 is a reduced view, partly broken away, along the line 4—4 of FIGURE 3.

Figure 1:
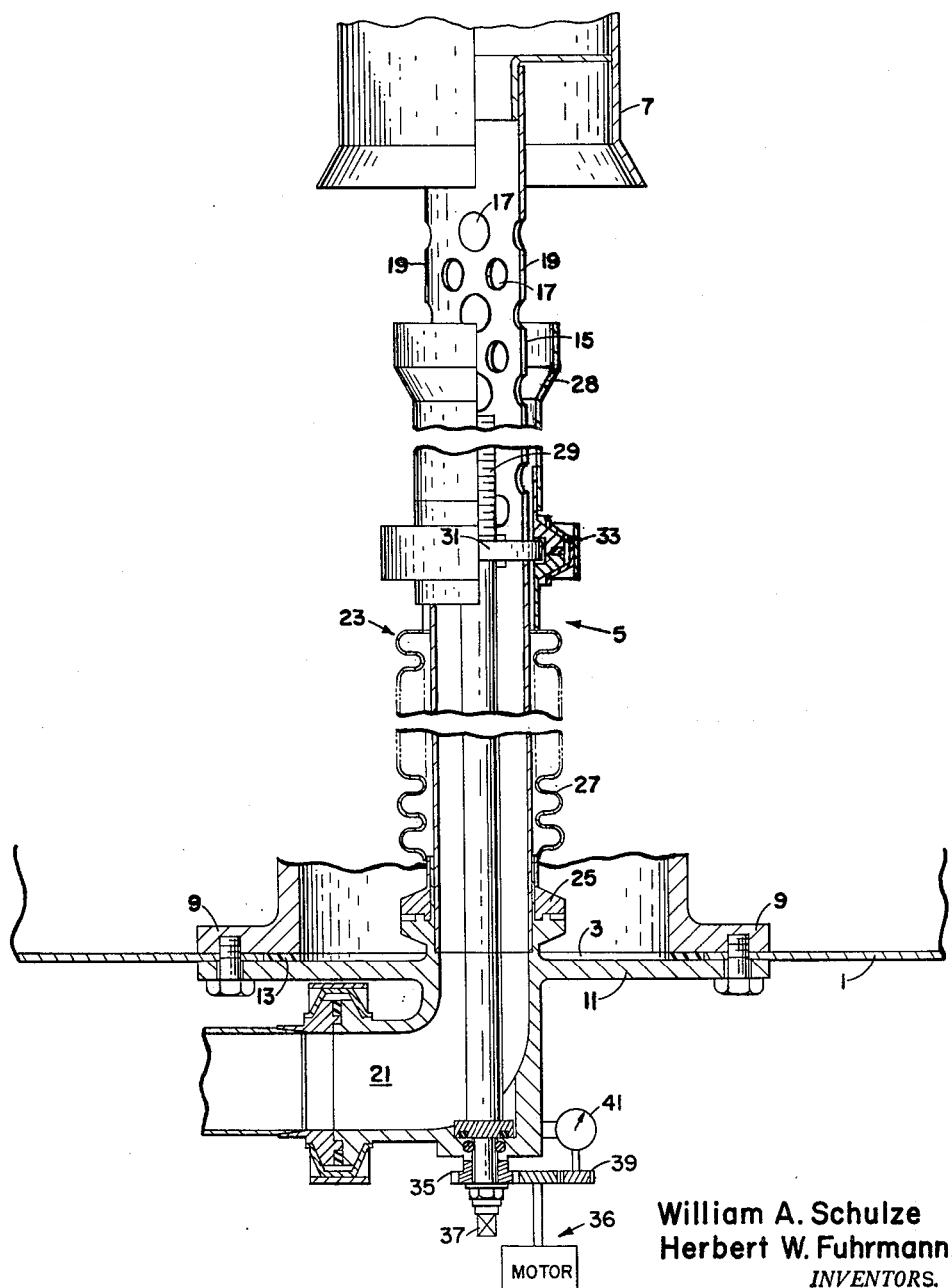
FIGURE 1 is a sectional view, partly broken away, showing one embodiment of the invention positioned in a missile tank.

In the drawings, wherein for the purpose of illustration there is shown preferred embodiments of the invention, the numeral 1 designates a liquid storage tank.

This tank is provided with an aperture 3, in one end (FIGURE 1) that is adapted to receive a portion of a liquid level indicating and varying device 5, and a cup-shaped element 7 disposed for holding one end of device 5 stationary. Tank 1 is also provided with a flange 9 which is secured to a flange 11 on device 5. The joint between these flanges is made liquid-tight by compressing a resilient seal 13 intermediate the flanges.

The portion of device 5 that extends through aperture 3 has a hollow tubular member 15, which has one end extending into engagement with element 7 for support thereby. Member 15 is also provided with a plurality of apertures 17 and a pair of diametrically opposed slots 19 (for a purpose to be explained later) intermediate its ends. The other end of member 15 is secured adjacent to flange 11 to an outlet section 21, which serves as an overflow line when tank 1 is overfilled.

In order to vary the height of the liquid in tank 1, an expandable hollow member 23 is secured adjacent to flange 11, so that it partially encloses member 15, by a clamp 25. Member 23 has a bellows section 27, positioned intermediate its ends which can be compressed or expanded to provide for changes in the height of member 23, and a hollow, flared upper section 28 for receiving excess liquid. This change is accomplished by a screwthreaded rod 29 disposed inside member 15 that has one end rotatably secured, by any suitable liquid-tight arrangement, in and extending thru the base of the liquid level indicating and varying device. The other end of rod 29 coacts with screwthreads in a cross bar 31 that extends thru slots 19, in member 15, and is secured to member 23 and section 28 by a liquid-tight clamp 33. The end of rod 29 that extends thru the base of device 5 is provided with a gear 35 that can be remotely connected to a means 36 for rotating the rod. This gear also coacts with a second gear 39, which is connected to a liquid level indicating gauge 41. The rod is also provided with a stub 37 that can be manually rotated to move rod 29 and thereby change the height of member 23.

The operation of the device is as follows:

The amount of liquid to be placed in tank 1 is determined. Rod 29 is then rotated in the proper direction, by use of stub 37 or means 36, so that the flared upper section 28 is either raised or lowered, due to bellows section 27 expanding or contracting. This movement of rod 29 also operates gauge 41, which indicates how much liquid can be placed in the tank without overflowing.

If the amount of liquid present in the tank is more than desired, the rod can be rotated, so that section 28 is lowered until gauge 41 indicates the desired amount. This lowering will allow some of the liquid to flow out of the tank thru outlet opening 21.

Figure 2:
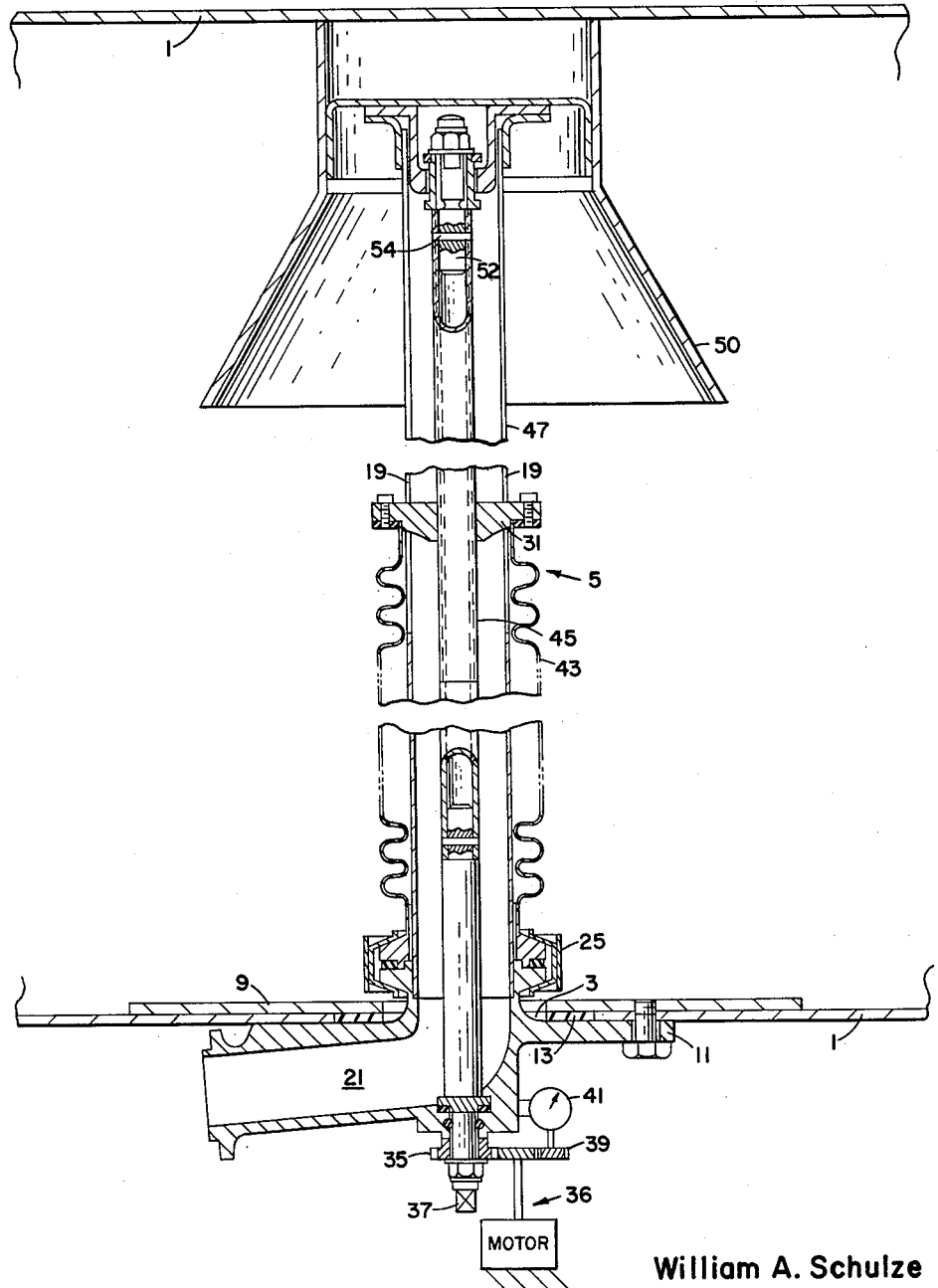
FIGURE 2, is a sectional view, partly broken away, showing another embodiment of the invention.

In the embodiment shown in FIGURE 2, wherein elements common to FIGURE 1 are identified by the same reference numeral, a different bellows section, a different hollow tubular member, and arrangement of the screwthreaded rod are used. The bellows section 43 is moved up or down by a sectional screwthread rod 45, by rotation of the rod in the same means as the first embodiment. This bellows does not use the flared upper section, but instead allows the liquid to flow over its top thru slots 19, in hollow tubular member 47, and out thru outlet opening 21. Member 47 is similar to member 15 except it does not utilize apertures 17. This member is also secured to a cup-shaped element 50 for support of its upperend.

Rod 45 is secured, adjacent to element 50, to a rotatable stud 52 by a pin 54 thereby allowing rod 45 to be rotated when it is desired to vary the height of bellows 43.

The operation of this embodiment is the same as the embodiment shown in FIGURE 1.

A third embodiment is shown in FIGURE 3, which also uses a bellows 56 flow-connected to outlet section 21. The upper end of the bellows is connected to a tubular member 58 having a flared opening 60. Tubular member 58 is secured to one end of a rotatable shaft 62 that has its other end extending thru the tank 1.

The tank is provided with a scale 64, adjacent shaft 62, which coacts with a pointer 66. The pointer is rotatably secured to shaft 62 adjacent to a handle 68, that is used for rotating shaft 62.

The operation of this embodiment is as follows:

The amount of fuel to be placed in the tank is determined and an operator rotates handle 68 until pointer 66 indicates on scale 64 the desired amount of liquid that is desired to be placed in the tank. The scale is calibrated for use with a specific size tank so that it indicates according to the position of tubular member 58, the amount of liquid which can be placed in the tank without overflowing. The tank can now be filled with the determined amount of liquid.

If it is desired to reduce the amount of liquid in the tank, then the handle is rotated, thereby lowering the open end of member 58 into the liquid, until the desired amount of liquid is indicated by the gauge. This allows the excess liquid to flow thru opening 60, member 58, thru bellows 56 and out section 21.

It is to be understood that the preferred invention is herein shown and described, and that various changes in the shape, size and arrangement of parts may be resorted to without departing from the spirit of the invention, or the scope of the subjoined claims.

The following invention is claimed:

1. A liquid level indicating and varying device for use in a sealed liquid containing tank, comprising:
   (a) an outlet section attached to the bottom portion of said tank;
   (b) a flexible conduit means having upper and lower open ends, said lower end being attached to said outlet section;
   (c) means for supporting the upper end of said flexible means within said tank;
   (d) means for varying the vertical position of the upper end of said flexible means; and
   (e) means coacting with said means for varying the position of said flexible means for indicating the amount of liquid in said tank.

2. A device as set forth in claim 1, within said flexible conduit means comprises:
   (a) a flexible conduit member; and
   (b) a hollow member having one end attached to said flexible means and a flared opening at its other end adapted to receive said liquid.

3. A device as set forth in claim 2, in which (c of claim 1) said means for supporting the other end of said flexible means comprises:
   (a) a rotatable rod having one end attached to said hollow member having said flared opening and the other end extending thru said tank.

4. A device as set forth in claim 3, in which (d of claim 1) comprises:
   (a) a handle secured to said rod for rotation of said rod and attached hollow member.

5. A device as set forth in claim 1, in which (c) said means for supporting the other end of said flexible member comprises:
   (a) a cross bar having a screwthreaded opening;
   (b) a rod having one end extending thru said outlet section and having screwthreads coacting with said screwthreads in said cross bar;
   (c) a cup-shaped element attached to the upper portion of said tank in alignment with said outlet section;
   (d) a tubular member located within said flexible conduit means and being attached at its upper end to said cup-shaped element and at its lower end to said outlet section, said tubular member having a plurality of apertures therein located above and below the upper portion of said flexible member.

6. A device as set forth in claim 5, in which (d of claim 1) said means for varying the position of said flexible member comprises:
   (a) a motor geared to said rod for rotation of said rod.

7. A device as set forth in claim 1, in which (e) said means for indicating the amount of liquid in said tank comprises:
   (a) a gauge operatively connected with (d) said means for varying the vertical position of said flexible means.

8. A liquid level indicating and varying device for use in a sealed liquid containing tank comprising:
   (a) an outlet section attached to the bottom portion of said tank;
   (b) a flexible member having upper and lower ends the lower end thereof being attached to said outlet section;
   (c) a cup-shaped element attached to said tank in alignment with said outlet section;
   (d) a screwthreaded bar extending thru said flexible member and having one end extending thru said outlet section and its other end rotatably secured to said cup-shaped element;
   (e) a hollow tubular member disposed between said flexible member and said screwthreaded bar and having one end secured to said outlet section and its other end secured to said cup-shaped element;
   (f) said hollow tubular member being provided with a pair of opposed slots;
   (g) a cross bar extending thru said slots in said tubular member and attached to the upper end of said flexible member and having a screw-threaded aperture engaged with the screwthreads on said bar;
   (h) means for rotating said bar thereby varying the vertical position of the upper end of said flexible member; and
   (i) means coacting with said means for rotating said bar for indicating the amount of liquid in said tank.

References Cited by the Examiner
UNITED STATES PATENTS

| 205,152 | 6/78 | Tonkin | 73—298 |
| 1,564,535 | 12/25 | Davis | 73—298 |
| 2,014,739 | 9/35 | Knight | 73—298 |
| 3,026,728 | 3/62 | Moklebust | 73—298 |

ISAAC LISANN, *Primary Examiner.*